Dec. 16, 1924.

T. DAVIS 1,519,575

FRAME FOR HOLDING AUTOMOBILE TAGS AND SIMILAR ARTICLES

Filed Oct. 2, 1922

Patented Dec. 16, 1924.

1,519,575

UNITED STATES PATENT OFFICE.

TREVALYN DAVIS, OF CINCINNATI, OHIO.

FRAME FOR HOLDING AUTOMOBILE TAGS AND SIMILAR ARTICLES.

Application filed October 2, 1922. Serial No. 591,810.

*To all whom it may concern:*

Be it known that I, TREVALYN DAVIS, a citizen of the United States, residing at the city of Cincinnati, in the county of Hamilton and State of Ohio, have invented certain new and useful Improvements in Frames for Holding Automobile Tags and Similar Articles, of which the following is a specification.

The object of my invention is to produce a frame for holding automobile tags, signs, notices, and the like, which shall be cheap of manufacture, simple in construction, and convenient and highly efficient in use, being more especially designed for holding automobile license tags.

It is a well known fact that the various States have and use automobile license tags of varying length and width and even some States have license tags varying in size.

By using my new frame and holder the tag will be held intact and make an enhanced appearance on the automobile, the naked tag marring the appearance and often destroying the surface of the automobile where it is hung.

I can, by using my improved frame and holder, make an ornamental appearance for the tag and can readily form any size for varying sized tags.

It is strong and serviceable and forms an article of manufacture which carries marked utility in the line for which it is intended to be used.

Its various features and advantages will readily become apparent from the following specification.

In the accompanying drawings, forming a part of this specification:

Figure 2:
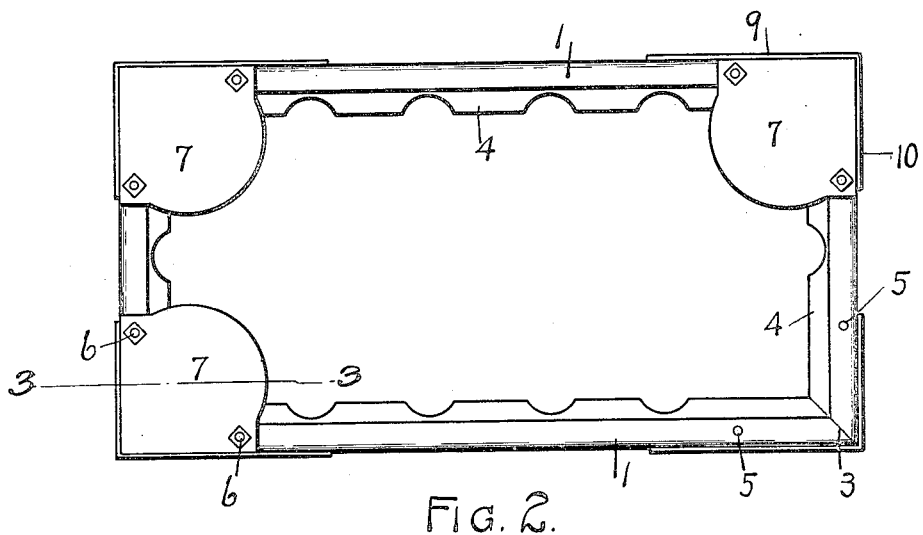
Fig. 2 is a plan view of the other side thereof, one of the corner pieces being omitted to illustrate the construction.
Figure 3:
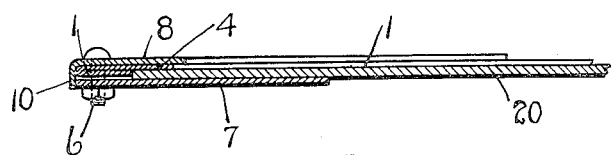
Fig. 3 is a sectional view on the line 3—3, of Fig. 2.

The frame itself is composed of the upper and lower frame pieces 1, 1, and the side frame pieces 2, 2; they are cut diagonally at their ends so as to meet as in a picture frame, see 3 in Fig. 2; it may be joined together in some other way if desired.

These frame pieces are either made originally of the size desired, but usually as long strips to cut the frame pieces therefrom. These pieces may be made plain or ornamental at their inner edges as shown or some other way. At their inner edges the frame pieces are depressed to form a ledge part 4, see Fig. 2, and upon this ledge part the automobile license tag rests.

When the frame parts are laid together and the license tag 20 is placed into position, corner plates are employed to hold them together, the frame parts being provided with holes 5, 5, thru which pass screws or bolts and nut connections 6, 6 which pass thru the frame parts and also thru the corner pieces and hold the parts firmly together, preventing any play of the parts. These plates consist of rear plates 7 and front plates 8. The rear plates 7 fit into the corners of the frame and square it at such points extending inwardly and being rounded on their inner edges so as to better hold the license tag; they may be made of any other form.

Figure 1:
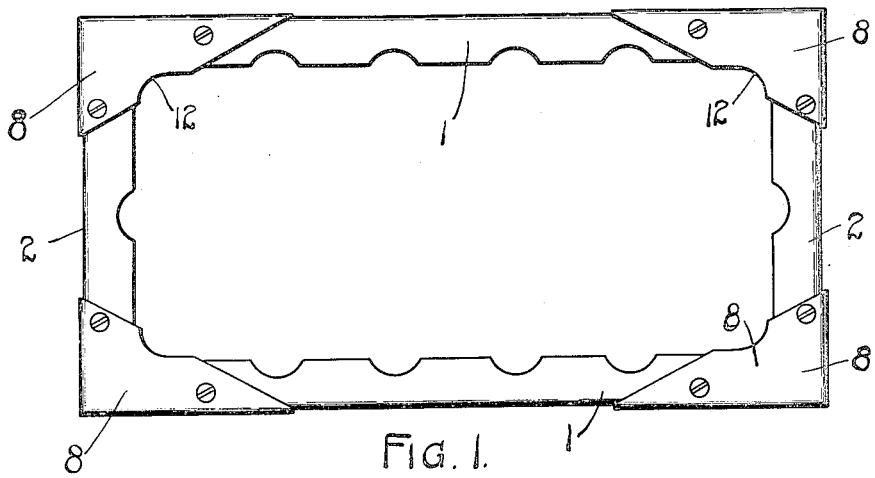
Fig. 1 is a plan view of one side of the frame and holder.

The outer plates or face plates pass over the corner edge of the frame and over the top and side edges of the frame parts 1 and 2, as shown particularly in Figs. 1 and 2, the edge which turns over the frame part 1 is marked 9 and the extended edge which passes over the frame part 2 is marked 10.

This is to bind and hold the frame parts in practically rigid condition in combination with the rear plates 7, the plates 8 are shortest at the side or end and extend materially along the edge of the frame parts 1, 1; they may be made of any other form. At their inner corner faces said plates 8 are cut away at 12 so as not to obscure the view of the license tag numbers.

What I claim as new and my invention and desire to secure by Letters Patent is:

A frame for holding metal license plates and the like including top and bottom and end bars, each of said bars consisting of a piece of strip metal folded longitudinally on itself to provide two portions, the edge of one of said portions terminating inwardly of the edge of the other portion in order to provide a ledge adapted to engage the edge of a license tag, front corner plates arranged at the meeting ends of said bars and each provided with an angular flange, rear corner plates projecting toward one another into the frame for the purpose of engaging the rear surface of a license tag, said rear corner plates engaging the flanges of the front corner plates, and means for securing the front corner plates, bars and rear corner plates together.

In testimony whereof, I affix my signature at Cincinnati, Ohio, this 29th day of September, 1922.

TREVALYN DAVIS.